Dec. 15, 1959 G. W. S. GRIFFITH 2,917,711

ELECTRIC AMPLIFIER ARRANGEMENTS

Filed Nov. 15, 1956

INVENTOR
George William Sapsworth Griffith
BY
ATTORNEYS

United States Patent Office 2,917,711

Patented Dec. 15, 1959

2,917,711

ELECTRIC AMPLIFIER ARRANGEMENTS

George William Sapsworth Griffith, Beamington Spa, England, assignor to The General Electric Company Limited, London, England Application November 15, 1956, Serial No. 622,371

Claims priority, application Great Britain November 17, 1955

5 Claims. (Cl. 330—53)

Figure 2:
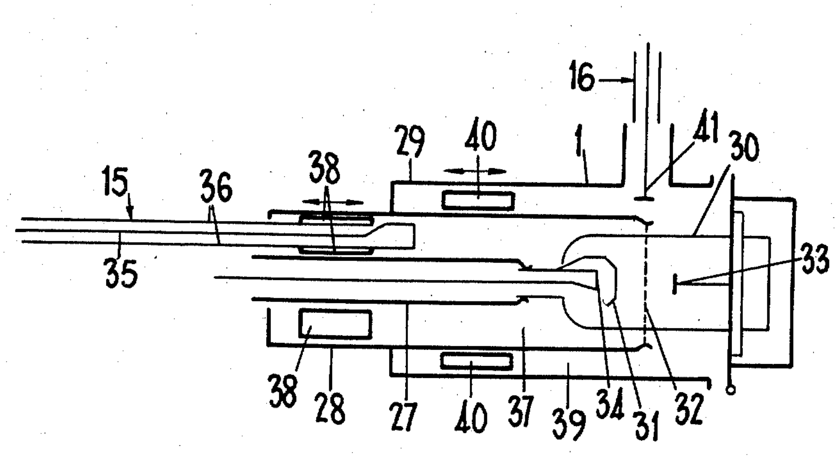

The present invention relates to electric amplifier arrangements.

If the last amplifier stage of a transmitter in a radio link, for example at a relay station, is connected to its aerial system by means of a feeder in the usual manner, it is found that there may be serious distortion of the transmitted signal caused by echoes. This is due to a small portion of the signal to be transmitted being reflected back down the feeder from the mismatch between the feeder and the aerial system. If the final amplifier stage does not present the correct impedance to the feeder, this echo will again be reflected and will return to the aerial system with the result that a portion of the echo will be transmitted. The interval between the required signal and the echo being transmitted is the time taken for the echo to travel twice the length of the feeder.

One object of the present invention is to provide an arrangement in which this difficulty is overcome or at least in which the power of the reflected echo is substantially reduced.

According to the present invention, an electric amplifier arrangement comprises a pair of amplifiers, means to supply the signal to be amplified to both of the said amplifiers out of phase (but not in quadrature), and a hybrid device for combining the output from the two amplifiers, the electrical lengths of the paths between the two amplifiers and the said hybrid device differing at the frequency of operation (but not differing by an odd number of quarter wavelengths) and the two amplifiers being detuned so that the impedance presented thereby to the said two paths are such that one has an inductive component while the other has a capacitative component with the result that the signals which are derived from the said signal to be amplified and which are supplied to the said hybrid device are in phase, and any signal supplied to the said hybrid device over the path of the output signal from that device is not appreciably reflected back over that path but is absorbed by resistance connected to the said hybrid device.

According to a feature of the present invention, an electric amplifier arrangement comprises a first hybrid device to which is arranged to be supplied an input signal, a pair of amplifiers which are arranged to be fed from the first hybrid device, and a second hybrid device for combining the output from the two amplifiers, the electrical lengths of the paths between the first hybrid device and the two amplifiers being different at the frequency of operaition (but not differing by an odd number of quarter wavelengths) while the electrical lengths of the paths between the two amplifiers and the second hybrid device also differ at the frequency of operation (but not differing by an odd number of quarter wavelengths) and the two amplifiers are detuned so that the impedances presented thereby to the said two paths that are connected between the amplifiers and the second hybrid device are such that one has an inductive component while the other has a capacitative component with the result that the signals which are derived from the input signal and which are supplied to the second hybrid device are in phase, and any signal supplied to the second hybrid device over the path of the output signal from that device is not appreciably reflected back over that path but is absorbed by resistance connected to the second hybrid device.

The hybrid devices may be of the type which is sometimes known under the name "ring hybrid" or "rat-race." An essential feature of a device of this type is an electrical path which is in the form of a closed loop and which has four terminals, the four terminals being spaced round the loop so that, by virtue of the different electrical distances between the terminals measured the two ways round the loop at a particular frequency when the terminals are correctly terminated, there is coupling between one of the terminals and two of the other terminals, while there is no coupling between that one terminal and the remaining terminal. The loop may be circular or any other convenient shape while the electrical path may be provided by either a waveguide or a coaxial transmission line. Alternatively the hybrid devices may be of the so-called "Magic-T" type.

Figure 1:
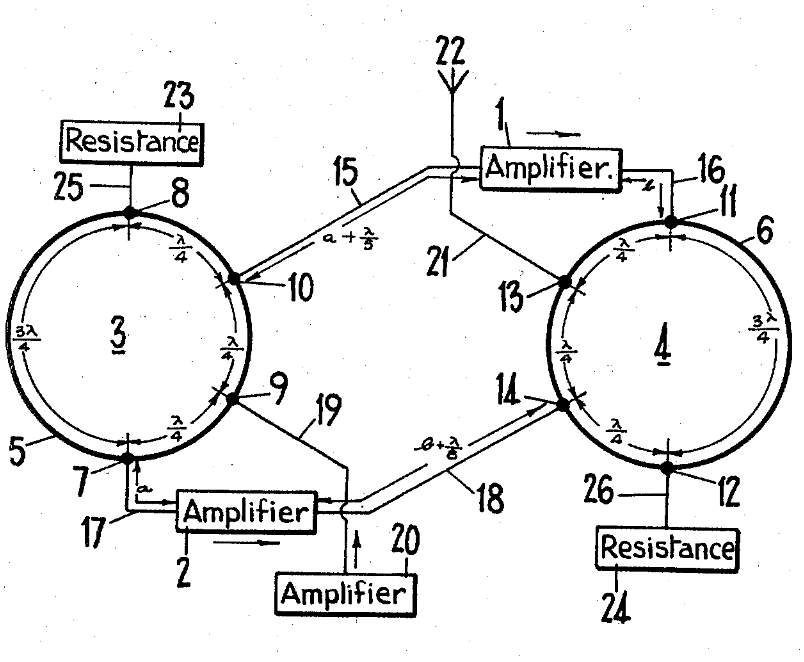

One example of an amplifier arrangement in accordance with the present invention will now be described by way of example with reference to the accompanying drawing in which Figure 1 shows diagrammatically the basic circuit of the arrangement, and Figure 2 shows in more detail a component of the circuit of Figure 1.

The amplifier arrangement shown constitutes the final amplifier stage of a frequency modulation transmitter which has a mean operating frequency in the region of 2,000 megacycles per second. The modulation signal may, for example, be a television signal or alternatively it may be a signal that carries the intelligence of a plurality of audio channels in frequency division multiplex.

Referring now to Figure 1, the amplifier arrangement comprises two like amplifiers 1 and 2 which are connected between a pair of hybrid devices 3 and 4. Each of the hybrid devices 3 and 4 is in the form of a ring 5 or 6 of coaxial transmission line having an electrical length equal to one and a half wavelengths at the centre frequency of the range of frequencies of the transmitted signal. This wavelength is hereinafter writter as $\lambda$. The hybrid devices 3 and 4 have four terminals 7 to 10 and 11 to 14 respectively and, considering more particularly the hybrid device 3, the terminals 7 and 8 lie on opposite sides of the ring 5, that is to say separated both ways round the ring 5 by a distance equal to $3\lambda/4$ while the terminals 9 and 10 are spaced $\lambda/4$ from the terminals 7 and 8 respectively and $\lambda/4$ from one another.

Connection to each of the four terminals 7 to 10 and 11 to 14 of the hybrid devices 3 and 4 is by way of coaxial transmission line. A tranmission line 15 having an electrical length $(a+\lambda/5)$ is connected between the terminal 10 of the hybrid device 3 and the input of the amplifier 1 while the output from the amplifier 1 is fed over a transmission line 16 having a length $b$ to the terminal 11 of the device 4. Similarly the amplifier 2 is supplied from the terminal 7 of the device 3 over a transmission line 17 having a length $a$ while the output therefrom is supplied to the terminal 14 of the hybrid device 4 over a transmission line 18 having a length $(b+\lambda/8)$.

The output circuits of the amplifiers 1 and 2 are detuned so that the amplifier 1 presents an impedance having an inductive component to the transmission line 16 that connects the amplifier 1 to the hybrid device 4 while the amplifier 2 presents an impedance having a capacitative component to the transmission line 18 that connects the amplifier 2 to the hybrid device 4. The electrical lengths $(a+\lambda/5)$, $b$, $a$, and $(b+\lambda/8)$ are so chosen that, with the amount of detuning of the two amplifiers 1 and 2, the phase of the signals passing between the terminals 7 and 10 and the terminals 14 and 11 through the amplifiers 2 and 1 respectively are effectively the same when they arrive at the hybrid device 4.

A transmission line 19 is connected between the penultimate amplifier stage 20 of the transmitter and the terminal 9 of the hybrid device 3 while the feeder 21 to the aerial 22 is connected to the terminal 13 of the hybrid device 4. Two matching resistors 23 and 24 are connected by way of transmission lines 25 and 26 to the terminals 8 and 12 of the hybrid devices 3 and 4 respectively.

The transmission lines 15 to 19, 21, 25, and 26, all have a characteristic impedance of 62 ohms while the resistors 23 and 24 and the input impedance of the amplifiers 1 and 2 have nominally the same value. The rings of coaxial transmission line 4 and 5 forming the hybrid devices 3 and 4 each has a characteristic impedance of approximately 87.7 ohms.

In the hybrid device 3 for example, there is with the present arrangement coupling between the terminals 7 and 9 since the distance one way round the ring 5 is $\lambda/4$ while the distance the other way round the ring 5 is $5\lambda/4$ with the result that component signals passing the two ways round the ring 5 are additive. Similarly there is coupling between the terminals 9 and 10. The distance between the terminals 8 and 9, however, is $\lambda/2$ one way round the ring 5 and $\lambda$ the other way so that there is effectively very little, if any, coupling between the terminals 8 and 9.

In operation of the arrangement described above, it will be appreciated that the signal supplied from the penultimate amplifier stage 20 is divided equally between the transmission lines 15 and 17 connected between the hybrid device 3 and the amplifiers 1 and 2, substantially none of this signal being absorbed by the matching resistor 23. Since the electrical distance between the terminal 9 and both the terminals 7 and 10 of the hybrid device 3 is $\lambda/4$, the signals supplied to the two transmission lines 15 and 17 are in phase and, as the effective total electrical lengths of the two paths between the hybrid devices 3 and 4 are the same, the amplified signals supplied to the hybrid device 4 are also in phase. These two signals thus combine at the terminal 13 of the hybrid device 4 and are supplied to the feeder 21.

If now an echo is returned down the feeder 21, due to mis-match between the feeder 21 and the aerial 22, the hybrid device 4 will cause this echo to be divided equally between the tranmission lines 16 and 18 connected to the amplifiers 1 and 2, the echo being in phase at the terminals 11 and 14. The electrical lengths $b$ and $(b+\lambda/8)$ of the transmission lines 16 and 18 are chosen so that, with the different reactive terminations presented by the amplifiers 1 and 2 as aforesaid, reflections due to mismatch between these transmission lines 16 and 18 and the amplifiers 1 and 2 result in the echo being returned to the terminals 11 and 14 in anti-phase. If now it is assumed that the amplifiers 1 and 2 cause the same standing wave ratio for these reflected portions of the echo, these portions will cancel out at the terminal 13 so that no part of the echo is returned over the feeder 21. These reflected portions of the echo are in fact absorbed by the resistor 24 connected to the terminal 12.

From the above, it will be appreciated that the electrical lengths $(a+\lambda/5)$ and $a$ and the electrical lengths $b$ and $(b+\lambda/8)$ differ by amounts that are not equal to an odd multiple of $\lambda/4$. Even if the mis-matches between the transmission lines 16 and 18 connected between the hybrid device 4 and the amplifiers 1 and 2 respectively are not identical, the arrangement described above produces considerable reduction in the power of the reflected echo.

In order to enable a visual check to be made that the arrangement is operating correctly, two power monitors may be connected through unidirectional couplers to the transmission lines 16 and 18 that are connected between the amplifiers 1 and 2 and the output hybrid device 4. The gains of the amplifiers 1 and 2 are then adjusted so that during operation signals of the same amplitude are supplied to the terminals 11 and 14 of the hybrid device 4.

Referring now to Figure 2 of the drawing which shows one of the amplifiers, the amplifier 1 say, of the amplifiers 1 and 2 of Figure 1 in more detail. The amplifier 1 comprises three hollow coaxial conducting cylinders 27, 28 and 29 arranged as shown. Situated within the cylinder 29 is a valve 30 that comprises a cathode 31, a grid 32 and an anode 33, the cathode 31 being indirectly heated by a coil 34.

The signal to be amplified is fed to the amplifier 1 by means of the coaxial transmission line 15, the inner conductor 35 of which is connected to the outer conductor 36 at a point within the cylinder 28. Coupling therefore results between the transmission line 15 and a resonant cavity 37 which is in part, bounded by the cylinders 27 and 28. The resonant frequency of the cavity 37 may be varied by a movable annular piston 38 which at the frequency considered forms, in effect, a short circuit between the cylinders 27 and 28 at one end of the cavity 37.

A further resonant cavity 39 is formed in the space between the cylinders 28 and 29 this cavity also being closed at one end by a movable annular piston 40 that, at the frequency considered, forms in effect, a short circuit between the cylinders 28 and 29. In setting up the arrangement the pistons 38 and 40 are adjusted to give maximum amplification, the piston 40 is then further adjusted to give the desired degree of de-tune between the amplifiers 1 and 2 for the operation of the network shown in Figure 1, as previously described.

The output of the amplifier 1 is taken from the resonant cavity 39 by means of the inner conductor of the coaxial transmission line 16 that extends into the cavity 39 to form a probe 41. The probe 41 is adjustable so that in use the position of maximum coupling may be found.

I claim:

1. An electric amplifier arrangement comprising a pair of amplifiers, means to supply a signal to be amplified to each of said amplifiers out of phase, a hybrid device for combining the output from the two amplifiers, and a resistance connected to said hybrid device, the electrical length of the path between one of the two amplifiers and said hybrid device being $x$ and the electrical length of the path between the other of the two amplifiers and said hybrid device being greater than $$x+\left(\frac{2n-3}{4}\right)\lambda$$

and less than $$x+\left(\frac{2n-1}{4}\right)\lambda$$

where $n$ is a positive integer and $\lambda$ is the wavelength of the signal to be amplified at the frequency of operation, the two amplifiers being detuned so that the impedances presented thereby to said two paths are such that one has an inductive component while the other has a capacitative component and the lengths of said two paths being such, within the limits set out, that with the amount of detuning of said amplifiers the signals which are derived from said signal to be amplified and which are supplied to said hybrid device are in phase, and any signal supplied to said hybrid device over the path of the output signal from that device is not appreciably reflected back over that path but is absorbed by the resistance connected to said hybrid device.

2. An electric amplifier arrangement comprising a first hybrid device to which is arranged to be supplied an input signal, a pair of amplifiers which are arranged to be fed from said first hybrid device, a second hybrid device for combining the output from the two amplifiers, and a resistance connected to said second hybrid device, the electrical length of the path between the first hybrid device and one of the two amplifiers being $y$ and the electrical length of the path between the first hybrid device and the other of the two amplifiers being greater than $$y+\left(\frac{2m-3}{4}\right)\lambda$$

and less than $$y+\left(\frac{2m-1}{4}\right)\lambda$$

where $m$ is a positive integer and $\lambda$ is the wavelength of the signal to be amplified at the frequency of operation, while the electrical length of the path between one of the two amplifiers and the second hybrid device is $x$ and the electrical length of the path between the other of the two amplifiers and the second hybrid device is greater than $$x+\left(\frac{2n-3}{4}\right)\lambda$$

and less than $$x+\left(\frac{2n-1}{4}\right)\lambda$$

where $n$ is a positive integer, the two amplifiers being detuned so that the impedances presented thereby to said two paths that are connected between the amplifiers and the second hybrid device are such that one has an inductive component while the other has a capacitative component and the lengths of the two paths between said first hybrid device and said amplifiers and of the two paths between said amplifiers and said second hybrid device being such, within the limits set out, that with the amount of detuning of said amplifiers the signals which are derived from the input signal and which are supplied to the second hybrid device are in phase, and any signal supplied to said second hybrid device over the path of the output signal from that device is not appreciably reflected back over that path but is absorbed by the resistance connected to said second hybrid device.

3. An electric amplifier arrangement according to claim 2 wherein said first and second hybrid devices are each formed by a ring of transmission line.

4. An electric amplifier arrangement according to claim 2 wherein said first and second hybrid devices are each formed by a ring of co-axial transmission line.

5. An electric amplifier arrangement according to claim 2 wherein said path of the output signal from said second hybrid device is constituted by an aerial feeder.

References Cited in the file of this patent

UNITED STATES PATENTS

| | | |
|---|---|---|
| 2,134,278 | Alford | Oct. 25, 1938 |
| 2,190,131 | Alford | Feb. 13, 1940 |
| 2,531,419 | Fox | Nov. 28, 1950 |
| 2,847,517 | Small | Aug. 12, 1958 |